United States Patent [19]

Nachtkamp et al.

[11] Patent Number: 4,481,345

[45] Date of Patent: Nov. 6, 1984

[54] PROCESS FOR THE PRODUCTION OF COMBINATIONS OF ORGANIC POLYISOCYANATES AND AT LEAST PARTLY BLOCKED POLYAMINES, THE COMBINATIONS OBTAINABLE BY THIS PROCESS AND THEIR USE FOR THE PRODUCTION OF LACQUERS, COATING OR SEALING COMPOSITIONS

[75] Inventors: Klaus Nachtkamp, Cologne; Manfred Bock, Leverkusen; Reinhard Halpaap; Josef Pedain, both of Cologne, all of Fed. Rep. of Germany

[73] Assignee: Bayer Aktiengesellschaft, Leverkusen, Fed. Rep. of Germany

[21] Appl. No.: 583,918

[22] Filed: Feb. 27, 1984

[30] Foreign Application Priority Data

Mar. 9, 1983 [DE] Fed. Rep. of Germany ....... 3308418

[51] Int. Cl.$^3$ ............................................. C08G 18/38
[52] U.S. Cl. ...................................... 528/59; 528/60; 528/61; 528/64; 528/75
[58] Field of Search ....................... 528/59, 60, 61, 64, 528/75

[56] References Cited

U.S. PATENT DOCUMENTS

| | | | |
|---|---|---|---|
| 2,498,419 | 2/1950 | Haury | 260/566 |
| 3,420,800 | 1/1969 | Haggis | 260/75 |
| 3,567,692 | 3/1971 | Haggis et al. | 260/75 |
| 3,932,357 | 1/1976 | Schmitt et al. | 260/75 |
| 4,009,307 | 2/1977 | Erikson et al. | 427/377 |

OTHER PUBLICATIONS

A.M. Paquin, Chem. Ber. 82, 316 (1949).

*Primary Examiner*—Maurice J. Welsh
*Attorney, Agent, or Firm*—Gene Harsh; Joseph C. Gil; Thomas W. Roy

[57] ABSTRACT

Process for the production of water-hardenable compositions of organic polyisocyanates and polyamines containing at least partly blocked amino groups present as ketimines, the combinations essentially representing mixtures and optionally reaction products containing urea groups by mixing the organic polyisocyanates with the polyamines in such quantities that the equivalent ratio of isocyanate groups to blocked and free amino groups is between about 0.9:1 and 4:1 and reacting any free amino groups present with some of the isocyanate groups in the polyisocyanate to form ureas, characterized in that the polyamines containing at least partly blocked amino groups used are mixtures comprising (a) from about 50 to 95 amine equivalent percent of organic compounds which are free from primary and secondary amino groups and which contain at least two ketimine groups corresponding to the following formula

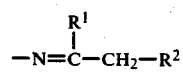

in which $R^1$ represents an alkyl or cycloalkyl radical and $R^2$ represents hydrogen or an alkyl or cycloalkyl radical or in which $R^1$ and $R^2$ form a cycloaliphatic hydrocarbon radical together with the two carbon atoms of the ketimine group and (b) from about 5 to 40 amine equivalent percent of organic compounds which are free from primary and secondary amino groups and which contain at least two ketimine groups of which one corresponds to the formula

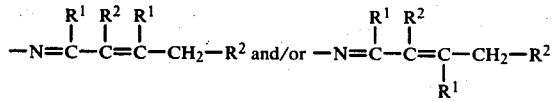

in which $R^1$ and $R^2$ are as defined above, the other ketimine group(s) present correspond(s) to the formula shown in (a).

10 Claims, No Drawings

PROCESS FOR THE PRODUCTION OF COMBINATIONS OF ORGANIC POLYISOCYANATES AND AT LEAST PARTLY BLOCKED POLYAMINES, THE COMBINATIONS OBTAINABLE BY THIS PROCESS AND THEIR USE FOR THE PRODUCTION OF LACQUERS, COATING OR SEALING COMPOSITIONS

BACKGROUND OF THE INVENTION

1. Field of the Invention

This invention relates to a new process for the production of water-hardenable compositions in the form of mixtures and optionally reaction products containing urea groups, of organic polyisocyanates and ketimine-blocked polyamines containing amino groups, to the compositions obtainable by this process and to their use for the production of water-hardenable lacquers, coating or sealing compositions.

2. Description of the Prior Art

Polyurethane coating compositions of polyisocyanates and blocked polyamines are known. Thus, DE-AS No. 15 20 139 for example describes water-hardenable mixtures of organic polyisocyanates, particularly prepolymers containing terminal isocyanate groups, and polyaldimines or polyketimines derived from polyamines.

Although the Examples of DE-AS No. 15 20 139 use distilled, almost analytically pure polyaldimines or polyketimines as starting materials, some of the mixtures described show only limited stability in storage. This is a practical disadvantage because the mixtures should of course remain liquid and, hence, processible for as long as possible before their application, for example for the formation of surface coverings. The stability in storage of the described mixtures or rather the "pot life" of the coating compositions produced from them is limited by the fact that the described imines, particularly the ketimines, react with isocyanate groups at a measurable velocity, even in the absence of water and at low temperatures. Short pot lives of only a few hours are also a feature of the coating compositions described in U.S. Pat. No. 4,009,307 which contain special isocyanate-terminated polyurethane prepolymers in admixture with special polyketimine materials.

According to DE-AS No. 15 20 139, "sterically hindered" polyaldimines or polyketimines, which show improved stability in storage in admixture with polyisocyanates, are preferably used for avoiding the disadvantages associated with short pot lives. According to DE-AS No. 15 20 139, "sterically hindered" imines are understood to be imines derived from aldehydes or ketones and polyamines in which the carbonyl group and/or at least one amino group is directly attached to a tertiary carbon atom. In addition, the use of aldimines is preferred to the use of ketimines according to the DE-AS in question because, in principle, aldimines show a lesser tendency to react with isocyanates in the absence of water.

However, both the measures proposed in DE-AS No. 15 20 139 for improving the stability in storage of isocyanate-imine mixtures are attended by disadvantages. The use of "sterically hindered" polyaldimines or polyketimines involves considerable expense because these imines cannot be synthesized from the simple polyamines generally used in polyurethane chemistry and/or from standard, inexpensive aldehydes or ketones as starting materials, instead specially synthesized and hence relatively expensive starting compounds have to be used. Another disadvantage of using "sterically hindered" polyaldimines or polyketimines lies in the fact that their reactivity to isocyanates is reduced not only in the absence of water, but also in the presence of water. As comparative tests have shown, coatings based on "sterically hindered" imines of the type in question harden distinctly more slowly than corresponding coatings containing imines of non-"sterically hindered" starting products.

In addition, the preference for aldimines as opposed to ketimines involves disadvantages insofar as aldehydes are released during the moisture hardening of polyisocyanate-polyaldimine mixtures. If they have a low boiling point, as is preferred according to DE-AS No. 15 20 139, aldehydes generally give off a stronger and more offensive odor than the ketones released from ketimines. This particular disadvantage also attends the coating compositions described in U.S. Pat. No. 3,932,357 (DE-OS No. 23 25 824) because these coating compositions are based exclusively on aldimines, preferably isobutyraldimines, which is particularly unfavorable in view of the unpleasant odor of the isobutyraldehyde given off.

Accordingly, the object of the present invention is to provide new, water-hardenable combinations of organic polyisocyanates and at least partly blocked polyamines which show improved stability in storage without any of the disadvantages referred to in the foregoing.

This object is achieved by the development of the process according to the invention which is described in detail hereinafter. The invention is based on the surprising observation that, in the absence of water, polyketimine mixtures which, in addition to "normal" ketimine groups of the structure

also contain a certain percentage of groups having the structure

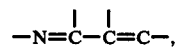

react with polyisocyanates as slowly as polyketimines of the type produced from "sterically hindered" synthesis components as defined in DE-AS No. 15 20 139 and that, at the same time, coating compositions containing the polyketimine mixtures suitable for use in accordance with the invention in combination with polyisocyanates harden distinctly more quickly after application to a substrate than corresponding mixtures containing ketimines of the "sterically hindered" synthesis components under otherwise comparable conditions.

The particular significance of the invention is attributable to the fact that the polyketimine mixtures suitable for use in accordance with the invention are directly obtainable from standard, non-sterically hindered polyamines and simple, non-sterically hindered ketones. This is because, by maintaining certain reaction conditions, the condensation reactions leading to Schiff's bases can be displaced in such a way that products "condensed to a relatively high degree" in the context of aldol condensation and containing functional groups of the structure

are formed. Reactions of this type are known, for example from A. M. Paquin, Chem. Ber. 82, 316 (1949) and U.S. Pat. No. 2,498,419. The polyamines and ketones suitable for use in accordance with the present invention may be reacted with one another in such a way as to form polyketimine mixtures containing functional groups of the structure

in addition to groups of the structure

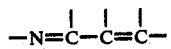

in such quantitative ratios that the crude product formed may be directly combined with polyisocyanates in accordance with the invention, optionally after the removal of solvents.

SUMMARY OF THE INVENTION

The present invention relates to a process for the production of water-hardenable compositions of organic polyisocyanates and polyamines containing at least partly blocked amino groups present as ketimines, the combinations in question essentially representing mixtures and optionally reaction products containing urea groups by mixing the organic polyisocyanates with the polyamines in such quantities that the equivalent ratio of isocyanate groups to blocked and free amino groups is between about 0.9:1 and 4:1 and reacting the free amino groups present, if any, with some of the isocyanate groups in the polyisocyanate to form ureas, characterized in that the polyamines containing at least partly blocked amino groups used are mixtures comprising (a) from about 50 to 95 amine equivalent percent of organic compounds which are free from primary and secondary amino groups and which contain at least two ketimine groups corresponding to the following formula $$-N=\overset{R^1}{\underset{|}{C}}-CH_2-R^2$$

in which $R^1$ represents an alkyl or cycloalkyl radical and $R^2$ represents hydrogen or an alkyl or cycloalkyl radical or in which $R^1$ and $R^2$ form a cycloaliphatic hydrocarbon radical together with the two carbon atoms of the ketimine group and (b) from about 5 to 40 amine equivalent percent of organic compounds which are free from primary and secondary amino groups and which contain at least two ketimine groups of which one corresponds to the formula

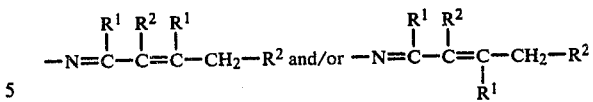

in which $R^1$ and $R^2$ are as defined above, whilst the other ketimine group(s) present correspond(s) to the formula shown in (a).

The present invention also relates to the compositions of organic polyisocyanates and at least partly blocked organic polyamines obtainable by this process which essentially represent mixtures and optionally reaction products containing urea groups and which optionally contain auxiliaries and additives known from lacquer technology.

The invention also relates to the use of the compositions of organic polyisocyanates and at least partly blocked organic polyamines obtainable by the process according to the invention, which essentially represent mixtures and optionally reaction products containing urea groups and which optionally contain auxiliaries and additives known from lacquer technology, as water-hardenable lacquers, coating or sealing compositions.

DETAILED DESCRIPTION OF THE INVENTION

The at least partially blocked amino groups may additionally contain (c) from 0 to 15 amine equivalent percent of organic compounds containing a free primary or secondary amino group and at least one ketimine group corresponding to the formula in (a), (d) from 0 to 15 amine equivalent percent of organic compounds free from ketimine groups and containing a total of at least two primary and/or secondary amino groups and (e) from 0 to 5 amine equivalent percent of organic compounds, other than those mentioned in (a) to (d), containing at least partly blocked amino groups, the percentages indicated adding up to 100.

In the above-mentioned ketimine components essential to the invention, the ketimine nitrogen atom provided with a free valency in the above formulae is directly attached to the hydrocarbon skeleton of the polyamine used for producing the organic compounds mentioned which contains further ketimine groups and/or amino groups as substituents and, optionally (where polyamines additionally containing secondary amino groups as bridging members are used), secondary amino groups as bridge members.

Starting materials for the process according to the invention are organic polyisocyanates, including the NCO-prepolymers known from polyurethane chemistry, and at least partly blocked polyamines.

The organic polyisocyanates have an (average) molecular weight of from about 140 to 10,000 and preferably an (average) NCO-functionality of from 2 to 4.

Suitable polyisocyanates are, for example, compounds corresponding to the following formula $$Q(NCO)_n$$

in which

Q represents an aromatic hydrocarbon radical optionally containing methyl substituents or methylene bridges and a total of 6 to 15 carbon atoms, an aliphatic hydrocarbon radical containing from 4 to 18 and preferably from 6 to 10 carbon atoms, a cycloaliphatic hydrocarbon radical containing from 6 to 15 carbon atoms or a xylylene radical, and n is an integer of from 2 to 4 and preferably from 2 to 3.

Typical examples of polyisocyanates such as these, which are suitable for use in accordance with the invention, are tetramethylene diisocyanate, hexamethylene diisocyanate, 1,12-dodecane diisocyanate, 1,18-octadecane diisocyanate, cyclohexane-1,3- and -1,4-diisocyanate and mixtures of these isomers, 1-isocyanato-3,3,5-trimethyl-5-isocyanatomethyl cyclohexane (IPDI), perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, 3,2'- and/or 3,4'-diisocyanato-4-methyl diphenylmethane, naphthylene-1,5-diisocyanate, triphenylmethane-4,4',4''-triisocyanate or 2,2',4,4'-tetraisocyanato-5,5'-dimethyl triphenylmethane.

Other suitable polyisocyanates are, for example, polyphenyl polymethylene polyisocyanates of the type obtained by phosgenating aniline-formaldehyde condensates and described, for example, in British Pat. Nos. 874,430 and 848,671; polyisocyanates containing carbodiimide groups of the type described in German Pat. No. 1,092,007; polyisocyanates containing allophanate groups of the type described, for example, in British Pat. No. 994,890 and in Belgian Pat. No. 761,626; polyisocyanates containing isocyanurate groups of the type described, for example, in U.S. Pat. No. 4,288,586, in German Pat. Nos. 1,022,789; 1,222,067 and 1,027,394, in German Offenlegungsschrift Nos. 19 29 034, 20 04 048 and 28 39 133 or in EP-OS No. 10 589; polyisocyanates containing urethane groups of the type described, for example, in Belgian Pat. No. 752,261 or in U.S. Pat. No. 3,394,164; polyisocyanates containing acylated urea groups according to German Pat. No. 1,230,778; and polyisocyanates containing biuret groups of the type described, for example in German Pat. No. 1,101,394, in British Pat. No. 889,050 and in French Pat. No. 2 047 737.

Other suitable polyisocyanates are, in particular the known so-called "lacquer polyisocyanates", i.e. polyisocyanates of relatively high functionality such as, for example, tris-(6-isocyanatohexyl)-biuret, optionally in admixture with its higher homologs, tris-(6-isocyanatohexyl)-isocyanurate (obtainable by trimerizing hexamethylene diisocyanate, for example in accordance with DE-OS No. 28 39 133), optionally in admixture with its higher homologs, and other isocyanurate-group-containing polyisocyanates obtainable by trimerizing aliphatic and/or aromatic diisocyanates, such as for example isophorone diisocyanates, diisocyanatotoluene or mixtures of diisocyanatotoluene and hexamethylene diisocyanate. Other suitable polyisocyanates are the urethane-group-containing polyisocyanates known per se and having a molecular weight below about 1000 of the type which may be obtained, for example, by reacting excess quantities of 2,4-diisocyanatotoluene with simple polyhydric alcohols having a molecular weight in the range from about 62 to 300, particularly with trimethylol propane, followed by removal of the unreacted diisocyanate excess by distillation.

Polyisocyanates of the type mentioned by way of example containing aliphatically and/or cycloaliphatically bound isocyanate groups are particularly suitable for the purposes of the invention. It is of course also possible to use mixtures of the polyisocyanates mentioned by way of example for producing the compositions according to the invention.

In addition to the low molecular weight polyisocyanates mentioned by way of example, it is also possible to use the relatively high molecular weight NCO-prepolymers known per se from polyurethane chemistry based on urethane-group-free polyisocyanates of the type mentioned by way of example and relatively high molecular weight polyhydroxyl compounds as the polyisocyanate component. These NCO-prepolymers generally have an (average) NCO-functionality of from 2 to 4 and preferably from 2 to 3 and an average molecular weight calculable from the stoichiometry of the starting materials of from about 1000 to 10,000 and preferably from about 1200 to 4000. Mixtures of these NCO-prepolymers with urethane-group-free polyisocyanates of the type mentioned by way of example, more particularly with the polyisocyanates used for producing the NCO-prepolymers, (semiprepolymers), may also be used as polyisocyanate component in the process according to the invention.

Urethane-group-free polyisocyanates suitable for producing the NCO-prepolymers are, for example, those corresponding to the above general formula, particularly 2,4- and/or 4,4-diisocyanatotoluene, 1-isocyanato-3,3,5-trimethyl-5-isocyanatomethyl cyclohexane, mixtures of 2,4'-diisocyanatodiphenyl methane with 4,4'-diisocyanato-diphenylmethane, particularly those containing at least about 15% by weight of 2,4'-isomer, or the perhydrogenated cycloaliphatic diisocyanates corresponding to the above-mentioned aromatic diisocyanates.

Reactants for these diisocyanates in the production of the NCO-prepolymers are the compounds known from polyurethane chemistry containing at least two isocyanate-reactive groups, preferably primary or secondary hydroxyl groups, and having a molecular weight in the range from about 300 to 10,000, preferably in the range from about 400 to 6000 and, more particularly, in the range from about 800 to 3500, optionally in admixture with low molecular weight polyhydric alcohols having a molecular weight in the range from about 62 to 300.

Suitable relatively high molecular weight polyhydroxyl compounds are the polyhydroxy polyesters or polyhydroxy polyethers known per se from polyurethane chemistry. Polyhydroxy polythioethers, polyhydroxy polyacetals, polyhydroxy polycarbonates or polyhydroxy polyester amides of the type known in principle from polyurethane chemistry are also suitable, although less preferred, for the production of the NCO-prepolymers.

The polyhydroxy polyesters are, for example, reaction products of polyhydric alcohols with polybasic carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic in nature and may optionally be substituted, for example by halogen atoms, and/or unsaturated. Examples of suitable polybasic carboxylic acids or carboxylic acid derivatives are succinic acid, adipic acid, sebacic acid, phthalic acid, isophthalic acid, trimelletic acid, phthalic acid anhydride, tetrahydrophthalic acid anhydride, hexahydrophthalic acid anhydride, tetrachlorophthalic acid anhydride, maleic acid, maleic acid anhydride, dimeric and trimeric fatty acids, such as oleic acid, optionally in admixture with monomeric fatty acids, terephthalic acid dimethyl ester, terephthalic acid bis-glycol ester.

Suitable polyhydric alcohols are, for example, ethylene glycol, 1,2- and 1,3-propylene glycol, 1,4-, 1,3- and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, diethylene glycol, triethylene glycol, tetraethylene glycol or dipropylene glycol.

The polyesters may contain terminal carboxyl groups. Polyesters of lactones, for example ε-caprolactone, or hydroxycarboxylic acids, for example ω-hydroxycaproic acid, may also be used.

The polyethers containing at least two hydroxyl groups suitable for use in accordance with the invention are also known per se and are obtained, for example, by polymerizing epoxides, such as ethylene oxide, propylene oxide, butylene oxide, tetrahydrofuran, styrene oxide or epichlorohydrin on their own, for example in the presence of $BF_3$, or by the addition of these epoxides, optionally in admixture or successively, onto starter components containing reactive hydrogen atoms, such as alcohols and amines, for example water, ethylene glycol, 1,3- or 1,2-propylene glycol, 4,4'-dihydroxydiphenylpropane, glycerol, trimethylol propane, aniline, ammonia, ethanolamine or ethylene diamine.

Polyethers modified by vinyl polymers, of the type obtained for example by polymerizing styrene, acrylonitrile in the presence of polyethers (U.S. Pat. Nos. 3,383,351; 3,304,273; 3,523,093; 3,110,695 and German Pat. No. 1,152,536) are also suitable.

Suitable, although less preferred polyhydroxy polythioethers, polyhydroxy polyacetals, polyhydroxy polycarbonates, polyesteramides or polyamides or starting materials suitable for their production are, for example, the compounds mentioned in U.S. Pat. No. 4,218,543 (herein incorporated by reference) at column 8, line 56 to column 9, line 15.

The low molecular weight polyhydric alcohols optionally used in admixture with the relatively high molecular weight polyhydroxyl compounds are, for example, ethane diol, 1,2- and 1,3-propane diol, 1,4- and 1,3-butane diol, pentane diols, hexane diols, octane diols, such as for example 2-ethyl-1,3-hexane diol, trimethylol propane, hexane triols or glycerol.

Representatives of the above-mentioned polyisocyanate and hydroxyl compounds used in the production of the NCO-prepolymers suitable for the purposes of the invention are described, for example, in High Polymers, Vol. XVI, "Polyurethanes, Chemistry and Technology" by Saunders-Frisch, Interscience Publishers, New York/London, Vol. 1, 1962, pages 32 to 42 and pages 44 to 54, and Vol. 2, 1964, pages 5 to 6 and 198 to 199, and also in Kunststoff-Handbuch, Vol. VII, Vieweg-Hochtlen, Carl-Hanser-Verlag, Munich, 1966, for example on pages 45 to 71.

The NCO-prepolymers are produced by known processes at temperatures in the range from about 30° to 190° C. and preferably at temperatures in the range from about 50° to 120° C. maintaining an equivalent ratio of isocyanate groups to hydroxyl groups of from 1.05:1 to 10:1 and preferably from about 1.1:1 to 3:1. Their production may be carried out either in the melt or in the presence of inert solvents, such as for example ethyl acetate, butyl acetate, ethylene glycol monoethyl ether acetate, propylene glycol monomethyl ether acetate, methyl ethyl ketone, methyl isobutyl ketone, toluene, xylene or mixtures thereof, or plasticizers such as, for example, those based on phosphoric acid, phthalic acid or sulfonic acid esters. Where an equivalent ratio of isocyanate groups to isocyanate-reactive groups of more than 2:1 is maintained during this reaction, mixtures of NCO-prepolymers with excess starting diisocyanates (semiprepolymers) are formed and may also be used in the process according to the invention.

The at least partly blocked polyamines used in the process according to the invention are polyketimine mixtures which may optionally contain small quantities of compounds containing free amino groups. It is essential to the invention that compounds containing groups corresponding to the following formula

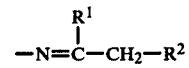

are present in these mixtures in addition to certain percentages of compounds containing groups corresponding to the following formulae

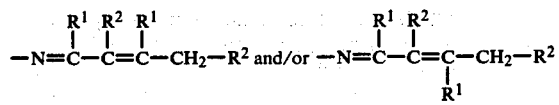

(in which $R^1$ and $R^2$ are as defined above).

The polyketimine mixtures suitable for use in accordance with the invention may be obtained by water-eliminating condensation reactions known per se between polyamines and ketones of the type described, for example, in Houben-Weyl, Methoden der organischen Chemie, Vol. XI/2, pages 73 et seq. These mixtures are preferably obtained directly by the condensation of polyamines and simple, non-sterically hindered ketones free from olefinic double bonds and corresponding to the following formula

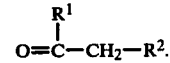

For producing the functional groups essential to the invention corresponding to the formulae

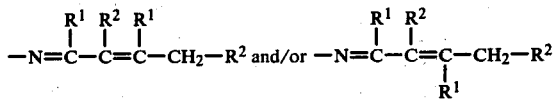

the reaction conditions applied correspond to those described, for example, by A.M. Paquin in Chem. Ber. 82, 316 (1949) and in U.S. Pat. No. 2,498,419 for obtaining the "condensed" Schiff's bases in the context of aldol condensation from primary amines and simple aldehydes or ketones. By suitable selecting the temperatures and reaction times, the condensation reactions are displaced in such a way that the components of the polyketimine mixtures are formed in the quantitative ratio according to the invention. The reaction does not have to be continued to the extent that all the amino groups in the polyamines used are completely blocked. However, it is important to ensure that the quantities of components containing free amino groups indicated in accordance with the invention are not exceeded in the reaction product. In general, these conditions are satisfied if mixtures of the polyamines mentioned by way of example hereinafter with ketones of the type mentioned by way of example hereinafter are heated using an equivalent ratio of primary amino groups to ketone groups of from about 1:1.1 to 1:5 and preferably from about 1:1.3 to 1:3, optionally in the presence of an entraining agent to facilitate removal of the water of condensation by distillation, such as for example benzene, toluene or xylene, and optionally in the presence of a catalytic quantity of a reaction accelerator for the condensation reaction, such as p-toluene sulfonic acid for example, at about 80° to 160° C. and preferably at about 110° to 140° C. with removal of the water of condensation by distillation until from about 0.8 to 1.2 and preferably from about 0.9 to 1.1 moles of water have been split off per mole of primary amino groups present at the beginning of the reaction. These quantities of water include both the water separated off for example in a water separator and also the water distilled off during the subsequent removal of excess ketone and entraining agents, if any, by distillation. The crude mixtures of the condensation reactions thus carried out, which are freed from excess ketone and entraining agents, if any, may be used in accordance with the invention without further purification for combination with the above-mentioned compounds containing isocyanate groups. They have the composition indicated above under (a) to (e). The completely or partly blocked polyamines which are not mentioned in (a) to (d) and which may be formed in small quantities in addition to these main components are collectively mentioned under (e). They are, for example, organic compounds containing free primary or secondary amino groups and at least one ketimine group corresponding to the formula appearing under (b) or organic compounds which are free from primary and secondary amino groups and which contain two or more ketimine groups corresponding to the formula appearing under (b) or even organic compounds containing ketimine groups with more than two conjugated double bonds. In general, the quantity in which each of the components collectively mentioned under (e) is present is no greater than about 1%, based on the total mixture of the at least partly blocked polyamines. Accordingly, their influence upon the end-use properties of the compositions according to the invention is negligible.

Particular preference is attributed to polyketimine mixtures of which the individual components contain structural units corresponding to the above formulae in which $R^1$ is a primary or secondary, saturated aliphatic hydrocarbon radical containing from 1 to 4 carbon atoms, more particularly a methyl, ethyl, isopropyl or isobutyl radical, and $R^2$ represents hydrogen or a primary or secondary, saturated aliphatic hydrocarbon radical containing from 1 to 3 carbon atoms, more particularly a methyl, ethyl or isopropyl radical, the sum of the carbon atoms present in the radicals $R^1$ and $R^2$ amounting to between 1 and 4.

The polyamines suitable for producing the polyketimine mixtures which may be used in accordance with the invention are organic compounds known per se containing at least two primary amino groups preferably attached to primary and/or secondary carbon atoms and, optionally, other secondary amino groups.

They are preferably aliphatic or cycloaliphatic diprimary amines the terms "aliphatic" and "cycloaliphatic" referring to the nature of the carbon atoms attached to the amino groups. Thus, araliphatic diamines are also regarded as aliphatic diamines in the context of the invention. It is particularly preferred to use diamines which contain in their molecule at least one cycloaliphatic ring containing in particular six ring carbon atoms, no significance being attributed to whether the amino groups are directly attached to this cycloaliphatic ring or to an alkyl substituent, more particularly a methyl substituent, thereof. The diamines used in the process according to the invention generally have a molecular weight in the range from about 60 to 500 and preferably in the range from about 100 to 250.

Examples of polyamines suitable for use in accordance with the invention are ethylene diamine, trimethylene diamine, tetramethylene diamine, hexamethylene diamine, 1,2-propylene diamine, the isomer mixture of 2,2,4- and 2,4,4-trimethyl hexamethylene diamine, 1,3- and 1,4-xylylene diamine, methyl-bis-(3-aminopropyl)-amine or even polyamines containing secondary amino groups, such as for example bis-(2-aminoethyl)-amine.

Preferred diamines include cycloaliphatic or aliphatic/cycloaliphatic diamines having a molecular weight in the range from about 114 to 300, such as for example:

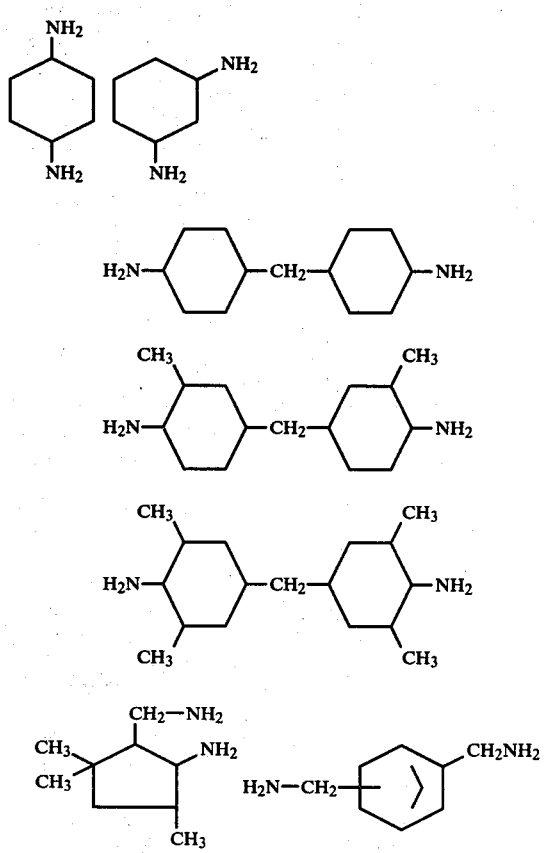

-continued

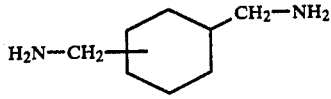

Particular preference is attributed to:

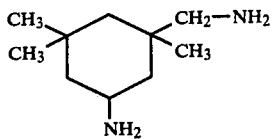

(isophoronediamine)

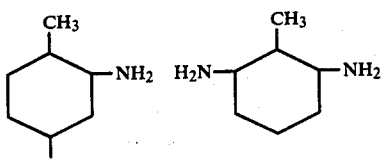

(2- or 4-methyl cyclohexane-1,3-diamine)

The ketones suitable for use in the preparation of the polyketimine mixtures used in accordance with the invention are preferably compounds corresponding to the following formula

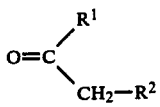

in which $R^1$ and $R^2$ are as defined above.

In other words, the compounds in question are aliphatic ketones containing a total of 3 to 19 and preferably 3 to 6 carbon atoms or cycloaliphatic ketones containing from 5 to 12 and preferably 5 or 6 carbon atoms. The ketones are preferably not sterically hindered, which is to be understood to mean that their carbonyl groups are not directly attached to a tertiary carbon atom. Examples of suitable ketones are acetone, methyl ethyl ketone, methyl propyl ketone, methyl isopropyl ketone, diethyl ketone, methyl isobutyl ketone, dipropyl ketone, 3-methyl-5-heptanone, diisobutyl ketone, methyl nonyl ketone, dinonyl ketone, cyclopentanone, cyclohexanone, methyl cyclohexanone and 3,3,5-trimethyl cyclohexanone (dihydro-isophorone). It is preferred to use ketones of the type mentioned by way of example which have a molecular weight in the range from about 58 to 100.

Methyl ethyl ketone and methyl isobutyl ketone are particularly preferred for preparing the polyketimine mixtures suitable for use in accordance with the invention. According to the foregoing, therefore, polyketimine mixtures prepared from methyl ethyl ketone or methyl isobutyl ketone and isophorone diamine or 2- and/or 4-methyl cyclohexane-1,3-diamine are particularly preferred. Polyketimine mixtures suitable for use in accordance with the invention may of course also be prepared from mixtures of different polyamines and/or different ketones of the type mentioned above.

To produce the compositions according to the invention, the components described in detail above, i.e. the organic polyisocyanates or NCO-prepolymers and the polyketimine mixtures, are mixed with one another. It is also possible to use mixtures of organic polyisocyanates and NCO-prepolymers of the type mentioned above for admixture with the polyketimine mixtures. The quantitative ratio between the components is generally selected in such a way that the equivalent ratio of isocyanate groups to the total of blocked and free amino groups is between about 0.9:1 and 4:1, preferably between about 1:1 and 2:1 and more preferably between about 1:1 and 1.2:1. Any free primary and/or secondary amino groups present in the polyketimine mixtures react off spontaneously with some of the isocyanate groups in the polyisocyanate component to form ureas. Accordingly, the products obtained by the process according to the invention are combinations representing mixtures and, optionally in addition, reaction products of the individual components containing urea groups.

If the quantitative ratio between the components is selected in such a way that the compositions according to the invention contain excess isocyanate groups, other NCO-reactive compounds may also be added to the compositions, although they should react more slowly with the NCO-groups than the polyamines on which the polyketimine components are based. Suitable compounds of the type in question are, for example, polyhydroxyl compounds of the type described in the foregoing as synthesis components for the NCO-prepolymers suitable for use in accordance with the invention. If no other NCO-reactive component is added, excess NCO-groups may of course even react off with atmospheric moisture after application of the compositions according to the invention.

Inert organic solvents or plasticizers may be added to the individual components or to the compositions according to the invention before, during or after mixing. If desired, solvents or plasticizers may even be present during the preparation of one or more starting components, as described in the foregoing in reference to the preparation of the NCO-prepolymers suitable for use in accordance with the invention. The solvents or plasticizers mentioned by way of example there are also suitable for diluting the compositions according to the invention. They should be largely free from water to guarantee adequate stability in storage of the mixtures. In general, the plasticizers or solvents are only used in the quantities necessary for establishing an adequate processing viscosity for the compositions according to the invention. Solids contents of at least about 50% and, more particularly, from about 60 to 90% by weight, are preferred. However, providing the starting components are suitably selected, it is also possible in principle to obtain compositions which may be applied with a solids content of 100%, i.e. without any solvent.

The compositions according to the invention are generally mixtures which are liquid at room temperature and stable in storage in the absence of water and which, after application to a suitable substrate, harden quickly in the presence of water (moisture). Accordingly, they are suitable for use as lacquers, coating compositions or sealing compounds. The addition of pigments and other lacquer auxiliaries and additives, such as fillers, leveling aids, etc., which is necessary for most applications, is preferably made by mixing the additives in question into the starting components, preferably into the isocyanate component, before preparation of the combinations according to the invention. In this connection, it is again important to ensure that the additives are free from water. The quantity in which the generally solid-additives in question are used should be taken into account in calculation of the above-mentioned solids content.

Adequate pot lives which always amount to several days are available for applying the coating composition based on the compositions according to the invention. Within this period, the coating compositions may be applied in one or more layers to substrates of any type by methods known per se, for example by spray coating, spread coating, dip coating, flood coating, roll coating or knife coating. The coatings are then dried in air at room temperature or even at elevated temperature. By applying heat during drying, the hardening process which is already rapid may be further accelerated. In general, temperatures of up to about 130° C. may be applied.

The coatings according to the invention may be applied to any substrates, including for example metals, wood, glass, stone, ceramics, concrete, rigid and flexible plastics, textiles, leather and paper. These substrates may be treated with standard primers before coating with the compositions according to the invention.

The production and properties of the products according to the invention are illustrated in the following Examples in which the percentages and "parts" quoted respectively represent percentages and parts by weight, unless otherwise indicated.

(A 1) Synthesis of a prepolymer containing NCO-groups

An NCO-containing prepolymer having an NCO-content of 3.4% and a viscosity at 23° C. of 1500 mPa.s was prepared from 437 parts of a linear polyester having an average molecular weight of 1700 obtained from 523 parts of adipic acid, 309 parts of 1,6-hexane diol and 168 parts of neopentyl glycol; 51 parts of a branched polyester having an OH-number of 145 obtained from 334 parts of isophthalic acid, 118 parts of adipic acid, 60 parts of phthalic acid anhydride, 380 parts of 1,6-hexane diol and 108 parts of trimethylol propane; 31 parts of 1,6-hexane diol; 231 parts of 3-isocyanatomethyl-3,5,5-trimethyl cyclohexane isocyanate; and 250 parts of butyl acetate: xylene (1:1).

(A 2) Synthesis of a prepolymer containing NCO-groups

A prepolymer having an NCO-content of 3.9% and a viscosity at 23° C. of 1100 mPa.s was prepared from 304 parts of a linear polyester (average molecular weight 1700) obtained from 523 parts of adipic acid, 309 parts of 1,6-hexane diol and 168 parts of neopentyl glycol; 105 parts of a linear polyester of adipic acid and 1,6-hexane diol (average molecular weight 840); 24 parts of trimethylol propane; 13 parts of 2-ethyl-1,3-hexane diol; and 254 parts of 3-isocyanatomethyl-3,5,5-trimethyl-cyclohexane isocyanate in 300 parts of ethyl glycol acetate.

(A 3) Synthesis of a prepolymer containing NCO-groups

A branched prepolymer having an NCO content of 8.4% and an average functionality of 2.6 was obtained from 242 parts of hexamethylene diisocyanate; 421 parts of a branched polyester (OH number 145) obtained from 334 parts of isophthalic acid, 118 parts of adipic acid, 60 parts of phthalic acid anhydride, 380 parts of 1,6-hexane diol and 108 parts of trimethylol propane; 77 parts of a linear polyester of adipic acid and 1,4-butane diol (OH number 124); and 11 parts of 3-hydroxymethyl-4-heptanol. This prepolymer was diluted with 250 parts of butyl acetate to form a 75% solution.

(B) Preparation of polyketimine mixtures suitable for use in accordance with the invention General Procedure To prepare the ketimines, the diamines, ketones and, optionally, the entraining agent were mixed and approximately 0.01% of p-toluene sulfonic acid, based on amine, was added to the resulting mixture. The mixture was then vigorously refluxed under nitrogen in a water separator until the quantity of water calculated beforehand has been separated off, after which the solution is concentrated in vacuo. The indicated compositions of the products were determined by gas chromatography, all the components present in a quantity of more than 1% being included. The compounds were assigned on the basis of mass spectra. Component (b) of the polyketimine mixtures containing olefinically unsaturated double bonds were generally present in the form of cis-/trans-isomer mixtures. However, this is totally irrelevant so far as the end-use properties of the combinations according to the invention are concerned. For this reason, this cis-/trans-isomerism is not discussed in detail either in the general description or in the following Examples.

(B 1)

270 parts of a polyketimine mixture having the composition indicated below were obtained from 170 parts of 3-aminomethyl-3,5,5-trimethylcyclohexane amine (isophorone-diamine), 210 parts of 2-butanone (methylethylketone) and 200 parts of toluene after the separation of 35 parts of water at a reaction temperature of 130° C. Composition of the polyketimine mixture: 2% toluene, 8% (13 amine equivalent percent) isophorone diamine, 4% (5 amine equivalent percent) monoketimine (MW 224) having the following structure:

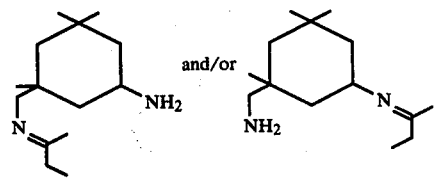

72% (72 amine equivalent percent) bis-ketimine (MW 278) having the following structure

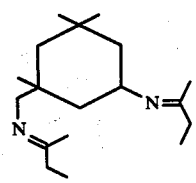

and 12% (10 amine equivalent percent) bis-ketimine (MW 332) having the following structure

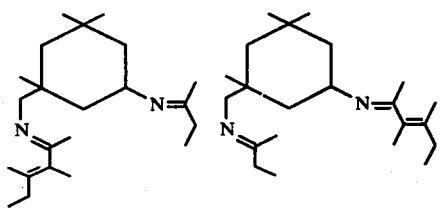

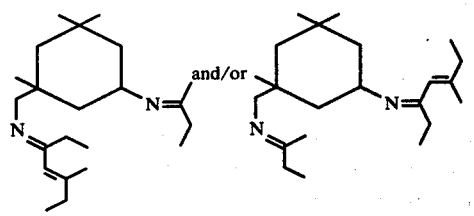

(B 2)

32 parts of water were separated from 170 parts of 3-aminomethyl-3,5,5-trimethylcyclohexane amine (isophorone-diamine) and 400 parts of 4-methyl-2-pentanone (methylisobutylketone) at a reaction temperature of 140° C. 320 parts of a mixture having the following composition were obtained: 1% methylisobutylketone, 1% (2 amine equivalent percent) isophoronediamine, 4% (5 amine equivalent percent) monoketimine (MW 252) having the following structure:

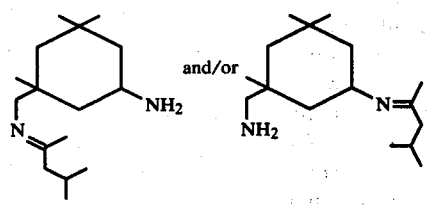

86% (86 amine equivalent percent) bis-ketimine (MW 334)

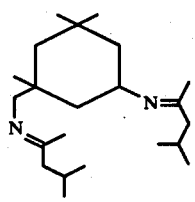

and 8% (7 amine equivalent percent) bis-ketimine (MW 416) having the following structures:

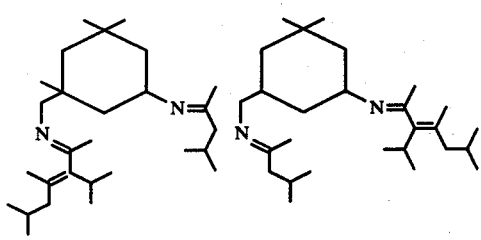

-continued

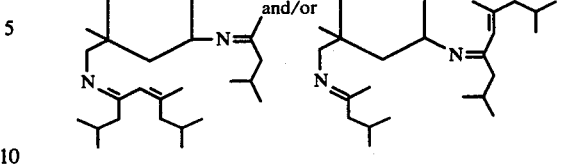

(B 3)

33 parts of water were separated off from a mixture of 128 parts of 2- and 4-methyl-1,3-cyclohexane diamine and 400 parts of 4-methyl-2-pentanone (methylisobutylketone) after stirring for several hours at 140° C. 278 parts of a polyketimine mixture having the following composition were obtained: 1% methyl isobutyl ketone, 9% (12 amine equivalent percent) monoketimine (MW 210) having the following structure:

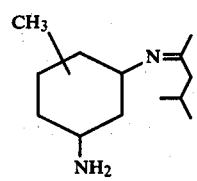

84% (83 amine equivalent percent) bis-ketimine (MW 292)

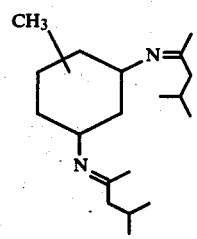

and 6% (5 amine equivalent percent) bis-ketimine (MW 374) having the following structures:

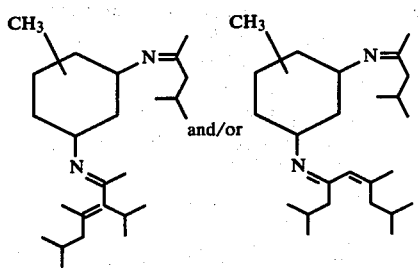

(B 4)

35 parts of water were separated off from 136 parts of 1,3-xylylene diamine and 400 parts of 4-methyl-2-pentanone (methylisobutylketone) at a reaction temperature of 140° C. 305 parts of a mixture having the following composition were obtained: 81% (84 amine equivalent percent) bis-ketimine (MW 300)

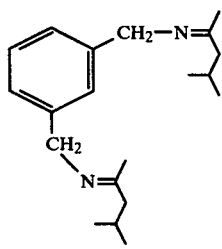

and 19% (16 amine equivalent percent) bis-ketimine (MW 382) having the following structures

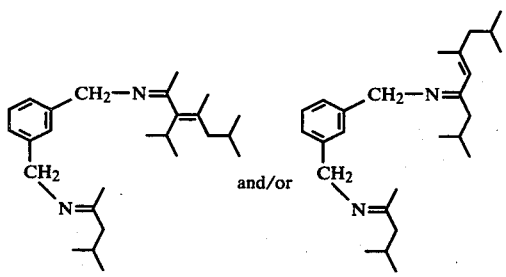

(C) Synthesis of sterically hindered polyketimines

The general procedure described in (B) was adopted for preparing the polyketimines.

(C 1)

30 parts of water were separated from a mixture of 170 parts of 3-aminomethyl-3,5,5-trimethyl cyclohexane amine (isophorone diamine) and 600 parts of 3,3-dimethyl-butanone (methyl-tert-butylketone) by stirring for several hours at 130° C. 312 parts of a mixture having the following composition were obtained: 1% methyl-tert-butylketone, 5% of monoketimine (MW 252) corresponding to the following structural formula:

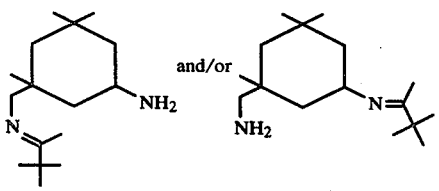

and 94% of bis-ketimine (MW 334) corresponding to the following structural formula

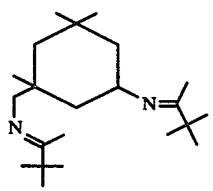

(C 2)

128 parts of 2- and 4-methyl-1,3-cyclohexane diamine in admixture and 600 parts of 3,3-dimethylbutanone (methyl-tert-butylketone) gave 270 parts of blocked diamine after the separation of 29 parts of water at a reaction temperature of 130° C. Distillation gives 170 parts of bis-ketimine (MW 292)

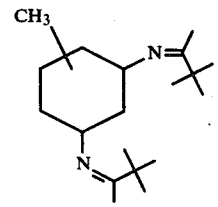

in 100% purity (boiling point 105°–110° C./0.4 Torr).

(C 3)

33 parts of water were separated at 130° C. from 136 parts of 1,3-xylylene diamine and 600 parts of 3,3-dimethyl-butanone (methyl-tert-butyl-ketone). Distillation at 145° C./0.6 Torr gave 281 parts of a mixture having the following composition: 2% of monoketimine (MW 218) corresponding to the following structural formula

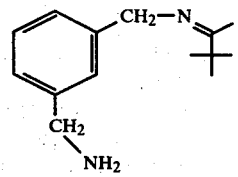

and 98% of bis-ketimine (MW 300) corresponding to the following structural formula

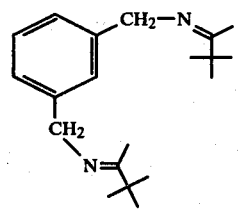

EXAMPLE 1

792 parts of the 75% solution of an NCO-containing prepolymer prepared by synthesis method (A 1) were mixed with 106 parts of the ketimine mixture of isophorone diamine and methyl isobutylketone obtained by method (B 2) and 102 parts of butyl acetate/xylene (1:1) to form a 70% clear lacquer. Whereas the pot life of the lacquer in a closed container amounts to about 45 days, a lacquer film applied in a thickness of 40 μm was sand-dry after only 30 minutes in air at room temperature and completely dry after 60 minutes. An elastic, abrasion-resistant lacquer was obtained after ageing.

Lacquer test (40 μm layer thickness)

Mandrel bending (ASTM-D-522, conical mandrel): OK

Erichsen indentation (DIN 53156): 10.6 (substrate cracks)

Impact indentation (ASTM-D-2794, ball impact test diameter 15.9 mm): >9 Nm

Abrasion resistance (Taber Abraser, CS 10 grinding roller, load 10N, 1000R): <5 mg.

The drying time of this lacquer can be further reduced by increasing the drying temperature. At 80° C., the lacquer showed the end properties mentioned above after less than 30 minutes and, at 130° C., after less than 20 minutes.

EXAMPLE 2 (Comparison with Example 1)

A lacquer was prepared in the same way as described in Example 1, except that the ketimine obtained by synthesis method (C 1) was used as the blocked diamine. The clear lacquer was prepared by mixing 792 parts of the prepolymer prepared by method (A 1) with 106 parts of the ketimine obtained by method (C 1) and 102 parts of butyl acetate/xylene. The pot life of this lacquer in a sealed container again amounted to about 45 days, although the lacquer film was only sand-dry after 2 hours and completely dry after about 3.5 hours.

EXAMPLE 3

838 parts of the NCO-containing prepolymer prepared by synthesis method (A 2) were mixed with 113 parts of the ketimine mixture according to (B 3) and 49 parts of butylacetate/xylene (1:1) to form a clear lacquer having a solids content of 70%. The pot life of this lacquer in a sealed container amounted to about 10 days which was entirely adequate for practical application. The lacquer film was sand-dry after about 1 hour and completely dry after about 2 hours, 15 minutes.

EXAMPLE 4 (Comparison with Example 3)

A lacquer containing a ketimine of a sterically hindered ketone was prepared for comparison. 838 parts of the prepolymer prepared by method (A 2) and 113 parts of the bis-ketimine of methyl-1,3-cyclohexane diamine and methyl tert-butylketone obtained by method (C 2), in conjunction with 49 parts of butyl acetate/xylene (1:1), gave a lacquer which had a pot life in a sealed container of more than 10 days, but which took distinctly longer to dry than the lacquer according to Example 3 (sand-dry after 3 hours, 20 minutes and only completely dry after more than 8 hours) and was therefore unsuitable for practical purposes.

EXAMPLE 5

A lacquer was obtained by mixing 813 parts of NCO-containing prepolymer prepared by method (A 1) with 90 parts of the ketimine mixture obtained by method (B 1) and 97 parts of butyl acetate/xylene (1:1). The lacquer has a pot life in a sealed container of about 9 days and, after application, was sand-dry after only 10 minutes and completely dry after only 35 minutes.

EXAMPLE 6

A white lacquer pigmented with titanium dioxide was prepared from the prepolymer obtained by method (A 1) (NCO-content 3.4%) the ketimine mixture obtained by method (B 2), titanium dioxide and butyl acetate/xylene (1:1); the components were used in a quantitative ratio of 528:71:233:168. The lacquer film was sand-dry after only 35 minutes and completely dry after 1 hour, 35 minutes. In spite of this, the lacquer had a pot life in a sealed container of more than 20 days.

Lacquer test after aging (50 μm film thickness)
Gloss (DIN 67530, 60° reflectometer value): 90
Mandrel bending test (ASTM-D-522, conical mandrel): OK
Impact indentation (ASTM-D-2794, ball impact test diameter 15.9 mm): >9 Nm
Abrasion resistance (Taber Abraser, CS 10 grinding roller, load 10N, 1000R) >10 mg By increasing the drying temperature, the drying time of the lacquer was reduced to 30 minutes at 80° C. or to 20 minutes at 130° C.

EXAMPLE 7 (Comparison with Example 6)

A white-pigmented lacquer was prepared in the same way as described in Example 6, except that the ketimine was replaced by the ketimine based on a sterically hindered ketone prepared by method (C 1), the components used being used in the same quantitative ratios as in Example 6. Although it had the same pot life in a sealed container of more than 20 days, the lacquer obtained took 2 hours, 45 minutes to become sand-dry and, even after 8 hours, was still not fully dry.

EXAMPLE 8

560 parts of the prepolymer containing isocyanate groups obtained by method (A 2), 75 parts of the ketimine mixture of methyl-1,3-cyclohexane diamine and methyl isobutylketone obtained by method (B 3) and 233 parts of titanium dioxide were mixed with 132 parts of butyl acetate/xylene to form a pigmented white lacquer having a solids content of 70%. Whereas the pot life of the lacquer in a sealed container amounted to about 10 days, the lacquer film dried very quickly, being sand-dry after about 30 minutes and completely dry after only 1 hour, 15 minutes.

EXAMPLE 9 (Comparison with Example 8)

A pigmented lacquer was prepared in the same way as described in Example 8, except that a ketimine of a sterically hindered ketone, methyl tert-butylketone, was used instead of the ketimine mixture of the sterically non-hindered ketone, methyl isobutylketone, the starting diamine being the same. The components were used in the same quantities, the ketimine being obtained by method (C 2). Compared with the lacquer of Example 8, this lacquer, although having a long pot life of more than 20 days, took distinctly longer to dry (sand-dry after about 1 hour, 30 minutes and completely dry after about 6 hours).

EXAMPLE 10

543 parts of the prepolymer containing isocyanate groups prepared by method (A 1), 60 parts of the ketimine mixture obtained by method (B 1), 233 parts of titanium dioxide and 164 parts of butyl acetate/xylene (1:1) were processed to form a pigmented lacquer having a solids content of 70%. For a pot life in a sealed container of 11 days, the lacquer film was sand-dry after only 20 minutes and completely dry after about 1 hour.

EXAMPLE 11

A pigmented white lacquer having a pot life in a sealed container of about 10 days was prepared from 253 parts of a polyisocyanate containing isocyanurate groups (NCO content 21.5%) obtained by trimerizing 1,6-hexane diisocyanate, 214 parts of the ketimine mixture according to (B 2) and 233 parts of titanium dioxide in 300 parts of butyl acetate/xylene (1:1). After application, a film of the lacquer was sand-dry in 1 hour, 10 minutes and completely dry after about 3 hours.

Testing of the lacquer shows that the highly elastic lacquer film had virtually reached its final hardness after only a few hours' drying.

Film thickness: 45 μm

Pendulum hardness
(DIN 53157)
after 4 h 84 s
after 24 h 87 s
after 14 d 95 s
Gloss (DIN 67530, 60° reflectometer value): 88 Mandrel bending test (ASTM-D-522, conical mandrel): OK Impact test (ASTM-D-2794, ball impact test diameter 15.9 mm): >9 Nm.

EXAMPLE 12 (Comparison with Example 12 of DE-AS No. 15 20 139)

A 50% clear lacquer (lacquer A) was prepared from 529 parts of the solution prepared by method (A 3) of a branched NCO-containing prepolymer based on hexamethylene diisocyanate and polyester polyol (NCO-content of the solid: 8.5%, average functionality: 2.6) and 103 parts of a ketimine mixture according to the invention based on m-xylylene diamine and methyl isobutylketone, obtained by method (B 4), and 368 parts of butyl acetate. A 50% clear lacquer (lacquer B) was prepared for comparison from 534 parts of the prepolymer solution obtained by method (A 3) and 99 parts of the sterically hindered ketimine based on m-xylylene diamine and methyl tert.-butylketone obtained by method (C 3) and 366 parts of butyl acetate.

The pot lives of these lacquers were compared in Table 1 with those of analogous lacquers according to DE-AS No. 15 20 139 (cf. Example 12 thereof) which also contained a branched, NCO-containing prepolymer based on hexamethylene diisocyanate (NCO-content 8.3%, average functionality 2.7) and which were also applied in the form of 50% solutions in butyl acetate.

The comparison in Table 1 shows the technical advantage afforded by using the polyketimine mixtures according to the present invention. Whereas the polyketimine mixture based on methyl isobutylketone according to DE-AS No. 15 20 139 showed very distinct disadvantages with regard to the shelf life of lacquers prepared therefrom (cf. lacquers I and J) compared with its "sterically hindered" analogue based on methyl tert.-butylketone, lacquer A of the polyketimine mixture according to the invention (based on methyl isobutylketone) was just as easy to handle as lacquer B of the "sterically hindered" polyketimine (based on methyl tert.-butylketone).

TABLE 1

| Lacquer | Polyketimine of m-xylylene diamine and | NCO/"NH$_2$"(1) | Pot life |
|---|---|---|---|
| A (present invention) | methyl isobutylketone | 1.2 | 15 days |
| B (present invention) | methyl-tert.-butylketone | 1.2 | 17 days |
| I (DE-AS No. 15 20 139) | methyl isobutylketone | 1.2 | 40 hours |
| J (DE-AS No. 15 20 139) | methyl-tert.-butylketone | 1.2 | 7 weeks |

(1)Equivalent ratio of isocyanate groups to blocked and free amino groups in the lacquer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of water-hardenable compositions of organic polyisocyanates and polyamines containing at least partly blocked amino groups present as ketimines, the compositions essentially representing mixtures and optionally reaction products containing urea groups which comprises mixing the organic polyisocyanates with the polyamines in such quantities that the equivalent ratio of isocyanate groups to blocked and free amino groups amounts to between about 0.9:1 and 4:1 and reacting the free amino groups present, if any, with some of the isocyanate groups in the polyisocyanate to form ureas, characterized in that the polyamines containing at least partly blocked amino groups are mixtures comprising
   (a) from about 50 to 95 amine equivalent percent of organic compounds which are free from primary and secondary amino groups and which contain at least two ketimine groups corresponding to the following formula $$-N=C-CH_2-R^2$$
$$\phantom{-N=}|\phantom{-CH_2-R^2}$$
$$\phantom{-N=C}R^1$$

in which $R^1$ represents an alkyl or cycloalkyl radical and $R^2$ represents hydrogen or an alkyl or cycloalkyl radical or in which $R^1$ and $R^2$ form a cycloaliphatic hydrocarbon radical together with the two carbon atoms of the ketimine group and
   (b) from about 5 to 40 amine equivalent percent of organic compounds which are free from primary and secondary amino groups and which contain at least two ketimine groups of which one corresponds to the following formula $$-N=C-C=C-CH_2-R^2 \text{ and/or } -N=C-C=C-CH_2-R^2$$

in which $R^1$ and $R^2$ are as defined above, and the remaining ketimine group(s) correspond(s) to the formula shown in (a).

2. The process as claimed in claim 1, characterized in that the organic polyisocyanates used are prepolymers containing terminal isocyanate groups based on excess quantities of polyisocyanates free from urethane groups and polyester or polyether polyols, the prepolymers having an (average) NCO-functionality of from 2 to 4 and an (average) molecular weight of from about 1000 to 10,000.

3. The process as claimed in claim 1, characterized in that the at least partly blocked polyamines are based on (i) cycloaliphatic or aliphatic-cycloaliphatic diamines having a molecular weight in the range from about 114 to 300 and (ii) dialkylketones having a molecular weight in the range from about 58 to 100.

4. A process for the production of water-hardenable compositions of organic polyisocyanates and polyamines containing at least partly blocked amino groups present as ketimines, the compositions essentially representing mixtures and optionally reaction products containing urea groups which comprises mixing the organic polyisocyanates with the polyamines in such quantities that the equivalent ratio of isocyanate groups to blocked and free amino groups is between about 0.9:1 and 4:1 and reacting the free amino groups present, if any, with some of the isocyanate groups in the polyisocyanate to form ureas, characterized in that the polyamines containing at least partly blocked amino groups are mixtures consisting of (a) from about 50 to 95 amine equivalent percent of organic compounds which are free from primary and secondary amino groups and which contain at least two ketimine groups corresponding to the following formula

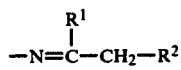

in which $R^1$ represents an alkyl or cycloalkyl radical and $R^2$ represents hydrogen or an alkyl or cycloalkyl radical or in which $R^1$ and $R^2$ form a cycloaliphatic hydrocarbon radical together with the two carbon atoms of the ketimine group, (b) from about 5 to 40 amine equivalent percent of organic compounds which are free from primary and secondary amino groups and which contain at least two ketimine groups of which one corresponds to the following formula

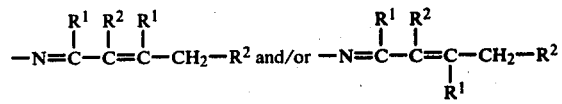

in which $R^1$ and $R^2$ are as defined above, and the remaining ketimine group(s) correspond(s) to the formula shown in (a), (c) from 0 to about 15 amine equivalent percent of organic compounds containing a free primary or secondary amino group and at least one ketimine group corresponding to the formula in (a), (d) from 0 to about 15 amine equivalent percent of organic compounds free from ketimine groups and containing a total of at least two primary and/or secondary amino groups and (e) from 0 to about 5 amine equivalent percent of organic compounds, other than those mentioned in (a) to (d) containing at least partly blocked amino groups the percentages of (a) to (e) adding up to 100.

5. The process as claimed in claim 4, characterized in that the organic polyisocyanates used are prepolymers containing terminal isocyanate groups based on excess quantities of polyisocyanates free from urethane groups and polyester or polyether polyols, the prepolymers having an (average) NCO-functionality of from 2 to 4 and an (average) molecular weight of from about 1000 to 10,000.

6. The process as claimed in claim 4, characterized in that the at least partly blocked polyamines are based on (i) cycloaliphatic or aliphatic-cycloaliphatic diamines having a molecular weight in the range from about 114 to 300 and (ii) dialkylketones having a molecular weight in the range from about 58 to 100.

7. The compositions produced in accordance with claim 1.

8. The compositions produced in accordance with claim 4.

9. A process for the preparation of coated substrates which comprises
(a) preparing a composition in accordance with claim 1 and
(b) coating a substrate with said composition.

10. The process as claimed in claim 2, characterized in that the at least partly blocked polyamines are based on (i) cycloaliphatic or aliphatic-cycloaliphatic diamines having a molecular weight in the range from about 114 to 300 and (ii) dialkylketones having a molecular weight in the range from about 58 to 100.

* * * * *